United States Patent [19]
Karol

[11] Patent Number: 5,095,381
[45] Date of Patent: Mar. 10, 1992

[54] PASSIVE TAP NETWORK

[75] Inventor: Mark J. Karol, Fair Haven, N.J.

[73] Assignee: AT&T Bell Laboratories, Murray Hill, N.J.

[21] Appl. No.: 463,581

[22] Filed: Jan. 11, 1990

[51] Int. Cl.$^5$ .............................................. H04J 2/00
[52] U.S. Cl. .................... 359/123; 359/127
[58] Field of Search ................... 370/1, 3, 4; 455/600, 455/606, 607, 612, 617; 350/96.16; 359/123, 127

[56] References Cited

U.S. PATENT DOCUMENTS

| | | | |
|---|---|---|---|
| 4,630,256 | 12/1986 | Albanese | 370/3 |
| 4,730,301 | 3/1988 | McMahon | 370/3 |
| 4,754,452 | 6/1988 | Henry | 370/85 |
| 4,797,879 | 1/1989 | Habbab | 370/3 |
| 4,901,306 | 2/1990 | Gardner | 370/3 |
| 4,914,648 | 4/1990 | Acampora | 370/3 |
| 4,930,117 | 5/1990 | Huggins | 370/3 |

OTHER PUBLICATIONS

Metcalfe et al., *Communications of the ACM*, vol. 19, No. 7, Jul. 1976, pp. 395-404.

Acampora et al., *AT&T Technical Journal*, Nov./Dec. 1987, vol. 66, Issue 6, pp. 21-34.

Kaminow, *AT&T Technical Journal*, Mar./Apr. 1989, pp. 61-71.

*Primary Examiner*—Curtis Kuntz
*Assistant Examiner*—L. Pascal
*Attorney, Agent, or Firm*—Eli Weiss

[57] ABSTRACT

A communications network is implemented utilizing a transmission medium and a plurality of Network Interface Units passively coupled thereto. Communications among a first set of Network Interface Units is implemented on a predetermined channel in a first portion of the transmission medium. Simultaneous communications among a second set of Network Interface Units is implemented using the same predetermined channel in a second portion of the transmission medium. Interference between communications in the first and second portions does not occur because the passive couplers disposed between the portions attenuate the signal from each portion to a value less than a predetermined Network Interface Unit sensitivity level before the signal reaches the other portion.

12 Claims, 1 Drawing Sheet

PASSIVE TAP NETWORK

TECHNICAL FIELD

This invention relates to communications systems and more particularly, to networks.

DESCRIPTION OF THE PRIOR ART

Communications networks have been widely used over the past several years. Lightwave Local Area Networks, in particular, have found widespread use because of their large bandwidth, low cost, and ease of implementation. Lightwave Local area Networks are typically implemented by employing a transmission medium and connecting Network Interface Units thereto, each of which serves to interface one or more user equipment to the network. Network Interface Units transmit data by broadcasting an optical signal onto the transmission medium, and receive data by passively coupling, via an optical coupler, an optical signal from the transmission medium.

One such Local Area Network is described in U.S. Pat. No. 4,754,452, issued to P. S. Henry on June 28, 1988. As described in the Henry patent, Network Interface Units transmit data packets, and each data packet contains an address that identifies the user equipment on the Local Area Network that are to receive the packet. Packets transmitted by a Network Interface Unit are received by all other Network Interface Units connected to the transmission medium via their respective couplers, and each Network Interface Unit examines the address in each packet it receives. If the address in the packet matches an address of any user equipment associated with the particular Network Interface Unit, the Network Interface Unit processes the packet. If the address in the received packet does not match an address assigned to a user equipment associated with the Network Interface Unit, the Network Interface Unit discards the packet.

Several drawbacks exist in such a Local Area Network. First, as a transmitted signal traverses the transmission medium, each coupler attenuates the energy by some predetermined amount. As a result, after the packet has traversed a predetermined number of couplers, typically 10-15, the signal on the transmission medium is so severely attenuated that it is less than a predetermined Network Interface Unit sensitivity level, and therefore, appears as noise to a Network Interface Unit. As described in the Henry patent, this problem is normally overcome by installing amplifiers at predetermined intervals along the transmission medium. The amplifiers regenerate the signal so that it is greater than the predetermined Network Interface Unit sensitivity level at all points along the transmission medium. The amplifiers, however, are expensive and add complexity to the Local Area Network.

Another drawback of such a Local Area Network is that typically, many different channels are implemented on a single transmission medium, for example, on an optical fiber using Wavelength Division Multiplexing. For a Network Interface Unit to communicate on any of the channels, it must be capable of tuning to any of the wavelengths in the band of interest. This requires that wavelength agile lasers be used and, therefore, increases the network cost.

SUMMARY OF THE INVENTION

These and other problems in known prior networks have been solved in accordance with the present invention. In the inventive network, a plurality of Network Interface Units are passively coupled to a transmission medium for reception of data. Communications among Network Interface Units in a first set is achieved using a predetermined channel and a predetermined first portion of the transmission medium. Simultaneous communications among Network Interface Units in at least a second set is achieved in a second portion of the transmission medium using the same predetermined channel at the same time. No substantial interference occurs between the communications because the nonoverlapping portions are separated by passive couplers of other Network Interface Units, which attenuate energy in either portion so that it is below a predetermined Network Interface Unit detection sensitivity level by the time it reaches the other nonoverlapping portion. In this manner, the invention takes advantage of the attenuation caused by the couplers, rather than attempting to overcome it, as did prior art networks.

In other embodiments, several sets of Network Interface Units are arranged along the transmission medium as described above, and data is transmitted from any Network Interface Unit to any other Network Interface Unit by "hopping" the data through one or more intermediate Network Interface Units.

DETAILED DESCRIPTION

Figure 1:
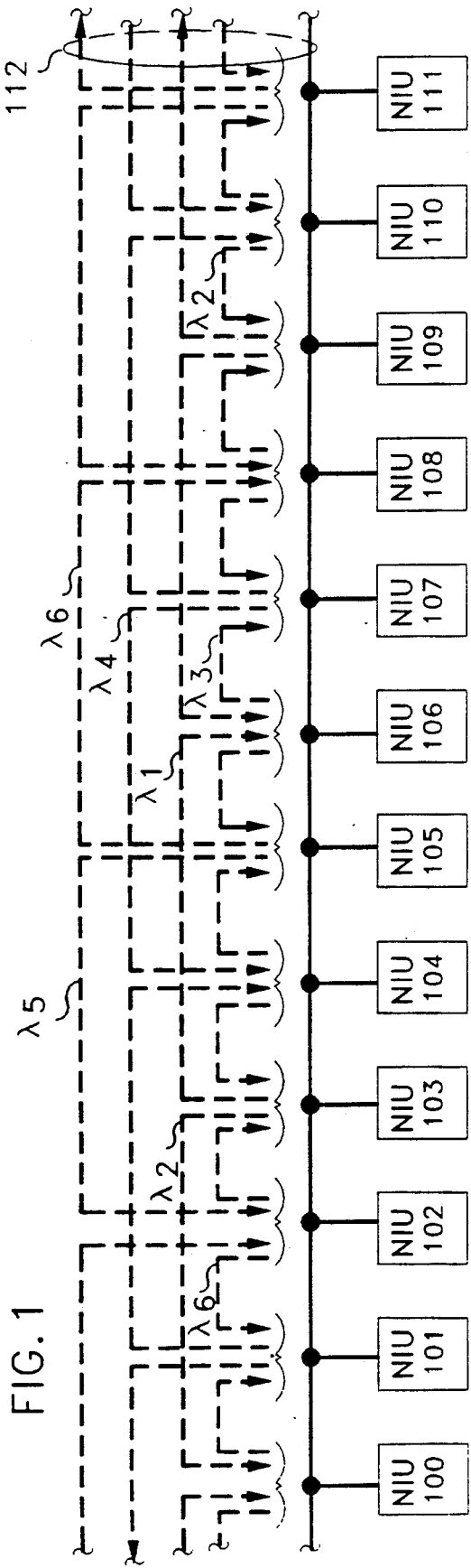
FIG. 1 shows a block diagram of an exemplary network in accordance with the present invention.

FIG. 1 shows a block diagram of an exemplary network in accordance with the present invention comprising (1) Network Interface Units (NIUs) 100-111, and (2) transmission medium 112. The transmission medium is assumed to be a single optical waveguide for exemplary purposes, and not for limitation. The exemplary connectivity pattern among the Network Interface Units is as follows: Any odd numbered Network Interface Unit in the network receives from its immediate neighbors and transmits to the Network Interface Units located three to the left, and three to the right. Even numbered Network Interface Units transmit to their respective neighbors and receive from the Network Interface Units located three to the left and three to the right. Each of the Network Interface Units 100-111 is attached to the transmission medium via a passive optical coupler. For simplicity and clarity of explanation, it is assumed herein that a signal transmitted by a Network Interface Unit will be attenuated to a value less than the predetermined Network Interface Unit sensitivity level after traversing three couplers. It should be noted that in practical optical networks, the signal is not attenuated to a value less than the predetermined Network Interface Unit sensitivity level until it has traversed approximately 10-15 Network Interface Units. Any one of a number of known Network Interface Units which include a passive coupler may be employed to practice this invention.

The network of FIG. 1 is arranged in a Wavelength Division Multiplexed manner, with several exemplary wavelengths shown. It can be seen that several of the wavelengths may be reused in separate nonoverlapping portions of the transmission medium. For example, note that wavelength λ6 is used for communications from Network Interface Unit 102 to Network Interface Unit 101 as well as for communications from Network Interface Unit 105 to Network Interface Unit 108. Further, note that wavelength λ2 is used for communications from Network Interface Unit 110 to Network Interface Unit 109 as well as for communications from Network Interface Unit 103 to Network Interface Unit 100. It should be noted that in the exemplary network of FIG. 1, each Network Interface Unit is arranged to transmit directly to only two other Network Interface Units, and to receive directly from only two other Network Interface Units. This is simply an exemplary connectivity pattern for purposes of explanation, and is not to be construed as limiting the scope or spirit of the invention.

In operation, a packet to be transmitted by a first Network Interface Unit to a second Network Interface Unit is either transmitted directly to the second Network Interface Unit or, if the connectivity pattern does not allow direct transmission from the first Network Interface Unit to the second Network Interface Unit, the packet is transmitted through one or more intermediate Network Interface Units until reaching the second Network Interface Unit. Examples of both types of packet transmissions are given below for clarification purposes.

Suppose an exemplary packet is to be transmitted from Network Interface Unit 103 to Network Interface Unit 106. As FIG. 1 shows, the packet may be transmitted directly on wavelength λ1. Note that Network Interface Units 100–105, all being separated by less than three couplers from Network Interface Unit 103, would also receive the packet, but would simply discard it. This packet discarding is most easily accomplished by employing a filter within the Network Interface Unit to suppress energy at wavelength λ1, but may be accomplished in any convenient manner. Suppose a packet is to be transmitted from Network Interface Unit 103 to Network Interface Unit 104. As FIG. 1 shows, Network Interface Unit 103 is not arranged to directly communicate to Network Interface Unit 104. Therefore, the intermediate Network Interface Units discussed above would be needed. This exemplary packet could be transmitted from Network Interface Unit 103 to Network Interface Unit 106 via wavelength λ1, from Network Interface Unit 106 to Network Interface Unit 107 via wavelength λ3, and finally, from Network Interface Unit 107 to Network Interface Unit 104 via and wavelength λ4.

Figure 2:
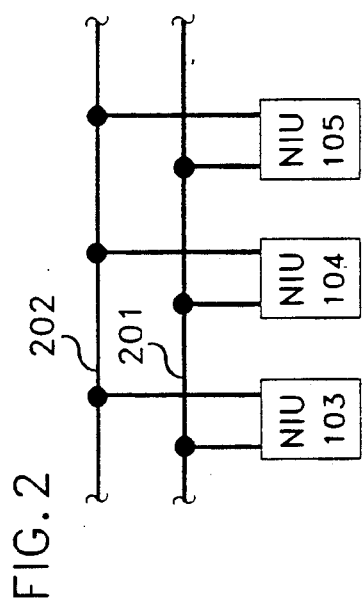
FIG. 2 depicts another embodiment of the present invention utilizing two busses for reliability.

While the above discussion describes the basic properties and operation of the inventive network, it should be noted that many variations of the invention may be constructed by those of ordinary skill in the art without violating the spirit and scope of the invention. A portion of one such variation is shown in FIG. 2. The Wavelength Division Multiplexed network of FIG. 1 is duplicated on two transmission media in FIG. 2, so that the network can tolerate a failure. More particularly, a failure on one of the transmission media could be detected, and the Network Interface Units could switch over and operate using the other transmission medium. Alternatively, the two transmission media could be used in conjunction to provide greater capacity, and failure of one of the media would merely degrade network performance, rather than cause the network to completely fail. Also, unit directional couplers could be utilized, with communications being implemented from left to right on one of the transmission media and from right to left on the other one of the transmission media. The connectivity pattern on each of the transmission media of FIG. 2 may be the same or different from the connectivity pattern on the other one of the media.

Note that theoretically, energy propagating along the transmission media is never completely attenuated. Rather, it is gradually attenuated by each passive coupler it traverses until it reaches a level which is less than some predetermined Network Interface Unit sensitivity level. The predetermined Network Interface Unit sensitivity level is one of the design parameters to be chosen when implementing the inventive network. The chosen sensitivity level will determine the number of Network Interface Units via passive couplers which much be connected to the medium before a channel may be reused.

The network may be arranged in any desired connectivity pattern, many of which are well known in the art. ShuffleNets and Chordal Rings are two exemplary connectivity patterns which may be used in the inventive network.

Other variations of the invention include reserving one or more "broadcast" wavelengths within a particular portion of the transmission medium. The broadcast wavelengths would provide communications among several Network Interface Units. Other multiplexing schemes, such as Time Division Multiplexing may be used instead of Wavelength Division Multiplexing. While the invention has its greatest value in optical communications, where coupler attenuation is a major problem, it should be noted that the invention may be implemented with any transmission medium. It should also be noted that if it is desired to utilize the same channel for two sets of communicating Network Interface Units which are separated by less than the required number of couplers, any attenuator may be placed on the medium to further attenuate a signal and prevent it from interfacing with other communications in a different portion of the transmission medium.

I claim:

1. A communications network comprising:
a transmission medium;
a plurality of Network Interface Units disposed along said transmission medium, each of said plurality of Network Interface Units being passively coupled to said transmission medium for receiving data, at least a first one of said Network Interface Units arranged to transmit data signals to at least a second one of said Network Interface Units along a first portion of said transmission medium or a predetermined channel, at least a third one of said Network Interface Units arranged to transmit data signals to at least a fourth one of said Network Interface Units along a second portion of said transmission medium on said predetermined channel, said first and second portions being nonoverlapping, and
passive coupler means disposed between said first and second portions for attenuating energy in data signals transmitted from said first one of said Network Interface Units to a value less than a predetermined Network Interface detection sensitivity before reaching said second portion of said transmission medium.

2. A communications network according to claim 1 wherein said means for attenuating includes at least one passive coupler.

3. A communications network according to claim 2 wherein each Network Interface Unit of a subset of said Network Interface Units is arranged to transmit data on a separate wavelength.

4. A communications network as set forth in claim 3 wherein said transmission medium comprises at least one optical waveguide.

5. A communications network as set forth in claim 2 wherein said transmission medium comprises at least one optical waveguide.

6. A communications network according to claim 2 wherein each Network Interface Unit of a subset of said Network Interface Units is arranged to transmit data during a different time slot.

7. A communications network as set forth in claim 6 wherein said transmission medium comprises at least one optical waveguide.

8. A communications network according to claim 1 wherein each Network Interface Unit of a subset of said Network Interface Units is arranged to transmit data on a separate wavelength.

9. A communications network as set forth in claim 8 wherein said transmission medium comprises at least one optical waveguide.

10. A communications network according to claim 1 wherein each Network Interface Unit of a subset of said Network Interface Units is arranged to transmit data during a different time slot.

11. A communications network as set forth in claim 10 wherein said transmission medium comprises at least one optical waveguide.

12. A communications network as set forth in claim 1 wherein said transmission medium comprises at least one optical waveguide.

* * * * *